(12) United States Patent
Ohyama

(10) Patent No.: US 6,320,837 B1
(45) Date of Patent: Nov. 20, 2001

(54) OPTICAL PICKUP AND OPTICAL DEVICE

(75) Inventor: Minoru Ohyama, Kanagawa (JP)

(73) Assignee: Victor Company of Japan, Limited, Kanagawa (JP)

(*) Notice: Subject to any disclaimer, the term of this patent is extended or adjusted under 35 U.S.C. 154(b) by 0 days.

(21) Appl. No.: 09/420,131

(22) Filed: Oct. 18, 1999

(30) Foreign Application Priority Data

Oct. 19, 1998 (JP) .................................. 10-297402

(51) Int. Cl.$^7$ ...................................... G11B 7/00

(52) U.S. Cl. ..................... 369/112.04; 369/121

(58) Field of Search ................... 369/112.01, 112.03, 369/112.04, 112.05, 112.06, 112.07, 112.11, 112.12, 121, 120

(56) References Cited

U.S. PATENT DOCUMENTS 6,130,872 * 10/2000 Sugiura et al. ............. 369/112.15 X

FOREIGN PATENT DOCUMENTS 10021577    1/1998  (JP) .

OTHER PUBLICATIONS

National Technical Report vol. 43, No. 3, Jun. 1997, pp. 55–62.
Hsi–Fu Shih et al., "Holographic Laser Module with Dual Wavelength for DVD Optical Heads", International Symposium on Optical Memory 1998, Technical Digest pp. 22–23 (Oct. 1998).

* cited by examiner

Primary Examiner—Paul W. Huber
(74) Attorney, Agent, or Firm—Nath & Associates PLLC; Gary M. Nath; Marvin C. Berkowitz

(57) ABSTRACT

A point where a first diffraction grating and an incident optical axis intersect is named as first intersection point, lengths from the first intersection point to points where ±primary-order diffracted lights by the first diffraction grating intersect a light receiving plane are named as first-a($1a$) optical path length, first-b($1b$) optical path length, and an average thereof is named as first average optical path length. A point where a second diffraction grating and the incident optical axis intersect is named as second intersection point, lengths from the second intersection point to points where ±primary-order diffracted lights by the second diffraction grating intersect a light receiving plane are named as second-a($2a$) optical path length, second-b($2b$) optical path length, and an average thereof is names as second average optical path length, At this time, the first diffraction grating, the second diffraction grating and the light receiving device substrate are disposed in such a way that a first curve in which the first average optical path length is constant and a second curve in which the second average optical path length is constant are in contact with each other at a single point.

12 Claims, 4 Drawing Sheets

OPTICAL PICKUP AND OPTICAL DEVICE

BACKGROUND OF THE INVENTION

1. Field of the Invention

The present invention relates to an optical pickup and optical device for use in a playback unit for an information recording medium such as an optical disc and more particularly to an optical pickup and optical device preferable for a compatible playback system for digital versatile disc (DVD) and compact disc-write once (CD-R).

2. Description of the Related Art

Currently, a DVD system has been proposed and marketed, and its prevalence has started, the DVD system having a higher density than an optical compact disc (CD) which has already prevailed as a consumer product. In DVD player as a playback unit of this system, compatible playback with CD is indispensable to avoid an overlapping of the devices and complexity of operation upon use. Likewise, the DVD player is also required to be compatible with the CD-R which can be played back by the CD player. A technology for playing back discs of various standards has been developed and further, simplification and reduction of cost for achieving it are problems to be solved.

For the aforementioned CD-R, a laser beam source having 780 nm band laser beam source different from 650 nm band for the DVD is required because reflectivity of an information recording medium has a high wave length dependency and therefore, an optical pickup containing a light source for two wave lengths (wavelengths) is necessary.

On the other hand, integration of optical system of the optical pickup has been demanded for the purpose of cost reduction and size reduction, and for this integration of the optical system, making a common optical axis of light from a light source having two wave lengths is effective. This is because by making common the optical axis, the optical path can be made single, and optical parts can be used in common and the like advantages exist.

As an optical system satisfying these requirements, such a structure in which diffraction gratings are disposed on the same optical axis and diffracted lights having each wave length (wavelength) are received by respective light receiving devices (photodetectors) can be considered.

However, it is very difficult to design such a diffraction grating as to change optical paths of lights having different wave lengths appropriately and to be provided with lens power (lens action). The reason is that because characteristics such as diffracting angle of the diffraction grating is determined depending on a mathematical relation between its cyclic structure and wave length of light, accordingly the diffracting angle changes largely with respect to a different wave length and further characteristics about optical path change and lens power (lens action) also change largely.

Thus, if lights having different wave lengths are emitted to the same diffraction grating, an optimum light receiving plane differs depending on the above-described characteristic change, so that sharing of the light receiving device (photodetector) substrate cannot be achieved, thereby obstructing a further integration of the optical system.

SUMMARY OF THE INVENTION

Accordingly, the present invention has been achieved to solve the above problem and therefore, it is an object of the invention to provide an optical pickup and optical device in which optical axes of two different kinds of lights are made common and diffracted lights of lights having different wave lengths can be received by a single light receiving device substrate, thereby contributing to integration of an optical system.

To achieve the above object, according to a first aspect of the present invention, there is provided an optical pickup for irradiating light to an information recording medium and reading information by using a reflection light from the information recording medium, the optical pickup comprising: a first diffraction grating disposed substantially perpendicular to an incident optical axis of the reflection light; a second diffraction grating disposed substantially perpendicular to an incident optical axis of the reflection light and on a face different from a face on which the first diffraction grating is provided; and a light receiving device substrate having light receiving plane on the same level, on which the reflection light from the information recording medium impinges and for receiving ±primary-order (±1st-order) diffracted light diffracted/divided by the first diffraction grating and the second diffraction grating; wherein a point where the first diffraction grating and the incident optical axis intersect is named as first intersection point, a length from the first intersection point to point where +primary-order (+1st-order) diffracted light diffracted by the first diffraction grating intersects the light receiving plane is named as first-a(1a) optical path length, a length from the first intersection point to a point where −primary-order (−1st-order) diffracted light diffracted by the first diffraction grating intersects the light receiving plane is named as first-b(1b) optical path length, and an average of the first-a(1a) optical path length and first-b(1b) optical path length is named as first average optical path length, a point where the second diffraction point and the incident optical axis intersect is named as second intersection point, a length from the second intersection point to a point where +primary-order (+1st-order) diffracted light diffracted by the second diffraction grating intersects the light receiving plane is named as second-a(2a) optical path length, a length from the second intersection point to a point where −primary-order (−1st-order) diffracted light diffracted by the second diffraction grating intersects the light receiving plane is named as second-b(2b) optical path length, and an average of the second-a(2a) optical path length and second-b(2b) optical path length is names as second average optical path length, the first diffraction grating, the second diffraction grating and the light receiving device substrate being disposed such that a first curve in which the first average optical path length is constant, a second curve in which the second average optical path length is constant and an optical axis after a reflection light from the information recording meclum passes through the first and second diffraction gratings as 0-order (0th-order) light intersects at a single point or substantially single point.

According to the present invention, the intersection point between the first curve, the second curve and the optical axis or the substantial intersecting point is a converging point of light passing through the first and second diffraction gratings as 0-order (0th-order) light. Even if the light receiving device substrate is disposed in any way within the above condition, the first-a(1a) optical path length and the first-b (1b) optical path length are equal with respect to the first average optical path length and the second-a(2a) optical path length and second-b(2b) optical path length are equal with respect to the second average optical path length. Alternatively, always one thereof increases by the same distance and the other decreases by the same distance. Thus, the light receiving plane of the light receiving device substrate can be set up as an optimum light receiving plane for the ±primary-order diffracted light by the first diffraction grating and ±primary-order diffracted light by the second diffraction grating. Optical axes of two different kinds of lights (for example, wave length) are made common and diffracted lights having different kinds (for example, wave length) of light are received by a single light receiving device substrate, thereby contributing to integration of an optical system.

Further, to achieve the above object, according to a second aspect of the invention, there is provided an optical pickup for irradiating light to an information recording medium and reading information by using a reflection light from the information recording medium, the optical pickup comprising: a laser beam source capable of emitting two different wave length lights; a first diffraction grating disposed substantially perpendicular to an incident optical axis of the reflection light; a second diffraction grating disposed substantially perpendicular to an incident optical axis of the reflection light and on a face different from a face on which the first diffraction grating is provided; and a light receiving device substrate having light receiving plane on the same level, on which the reflection light from the information recording medium impinges and for receiving ±primary-order diffracted light diffracted/divided by the first diffraction grating and the second diffraction grating; wherein a point where the first diffraction grating and the incident optical axis intersect is named as first intersection point, a length from the first intersection point to a point where +primary-order diffracted light diffracted by the first diffraction grating intersects the light receiving plane is named as first-a(1a) optical path length, a length from the first intersection point to a point where primary-order diffracted light diffracted by the first diffraction grating intersects the light receiving plane is named as first-b(1b) optical path length, and an average of the first-a(1a) optical path length and first-b(1b) optical path length is named as first average optical path length, a point where the second diffraction point and the incident optical axis intersect is named as second intersection point, a length from the second intersection point to a point where +primary-order diffracted light diffracted by the second diffraction grating intersects the light receiving plane is named as second-a(2a) optical path length, a length from the second intersection point to a point where −primary-order diffracted light diffracted by the second diffraction grating intersects the light receiving plane is named as second-b(2b) optical path length, and an average of the second-a(2a) optical path length and the second-b(2b) optical path length is names as second average optical path length, the first diffraction grating, the second diffraction grating and the light receiving device substrate being disposed such that a first curve in which the first average optical path length is constant and a second curve in which the second average optical path length is constant are in contact with each other at an emission point of the laser beam source or its conjugate point or intersect each other at a substantially single point.

According to the present invention, the emission point of the laser beam source in which the first curve and the second curve are in contact with each other or its conjugate point is a converging point of light passing through the first diffraction grating and second diffraction grating as the 0-order light. Even if the light receiving device substrate is disposed in any way within the above condition, the first-a(1a) optical path length and the first-b(1b) optical path length are equal with respect to the first average optical path length and the second-a(2a) optical path length and second-b(2b) optical path length are equal with respect to the second average optical path length. Alternatively, always one thereof increases by the same distance and the other decreases by the same distance. Thus, the light receiving plane of the light receiving device substrate can be set up as an optimum light receiving plane for the ±primary-order diffracted light by the first diffraction grating and ±primary-order diffracted light by the second diffraction grating. Optical axes of two different kinds of lights (for example, wave length) are made common and diffracted lights having different kinds (for example, wave length) of light are received by a single light receiving device substrate, thereby contributing to integration of an optical system.

According to a preferred embodiment of the present invention, the light receiving device substrate is disposed substantially perpendicular to the incident optical axis of the reflection light and any one or both of the first diffraction grating and the second diffraction grating are formed of a hologram device (holographic element) having lens power.

According to this embodiment, the first-a(1a) optical path length and first-b(1b) optical path length are equal (first average optical path length) and the second-a(2a) optical path length and second-b(2b) optical path length are equal (second average optical path length). One of the ±primary-order diffracted lights by one or both of the first diffraction grating and the second diffraction grating composed of a hologram device (holographic element) forms a focus point or focal line before it reaches the light receiving plane by lens power, while the other one of the ±primary-order diffracted light forms a focus point or focal line in the back of the light receiving plane by the lens power. Thus, an optical system preferable for detection of focus error based on spot size method can be constructed.

According to another preferred embodiment of the present invention, the light receiving device substrate is so disposed as to be inclined with respect to a plane perpendicular to the incident optical axis.

According to this embodiment, one of the first-a(1a) optical path length and the first-b(1b) optical path length increases with respect to the first average optical path length, while the other decreases by the same distance. Further, one of the second-a(2a) optical path length and second-b(2b) optical length increases with respect to the second average optical path length, while the other decreases by the same distance. One of the respective ±primary-order diffracted lights by the first diffraction grating and second diffraction grating forms a focus point or focal line before it reaches the light receiving plane while the other of the ±primary-order diffracted lights forms a focus point or focal line in the back of the light receiving plane. Therefore, two optical systems preferable for detection of a focus error based on the spot size method can be constructed.

Further, to achieve the above object, according to a third aspect of the present invention, there is provided an optical device for use in the optical pickup according to the first aspect wherein the first diffraction grating, the second diffraction grating and the light receiving device substrate are fixed integrally in the same casing(package).

According to the optical device of the present invention, the same effect as the optical pickup of the first aspect can be obtained.

Further, to achieve the above object, according to a fourth aspect of the present invention, there is provided an optical device for use in the optical pickup according to the second aspect wherein the laser beam source, the first diffraction grating, the second diffraction grating and the light receiving device substrate are fixed integrally in the same casing (package).

According to the optical device of the present invention, the same effect as the optical pickup of the second aspect can be obtained.

According to a preferred embodiment of the present invention, the light receiving device substrate is disposed substantially perpendicular to the incident optical axis of the reflection light and any one or both of the first diffraction grating and the diffraction grating are composed of a hologram device having lens power.

According to a preferred embodiment of the present invention, the light receiving device substrate is so disposed as to be inclined with respect to a plane perpendicular to the incident optical axis.

The nature, principle and utility of the invention will become more apparent from the following detailed description when read in conjunction with the accompanying drawings.

DESCRIPTION OF THE PREFERRED EMBODIMENTS

Figure 1:
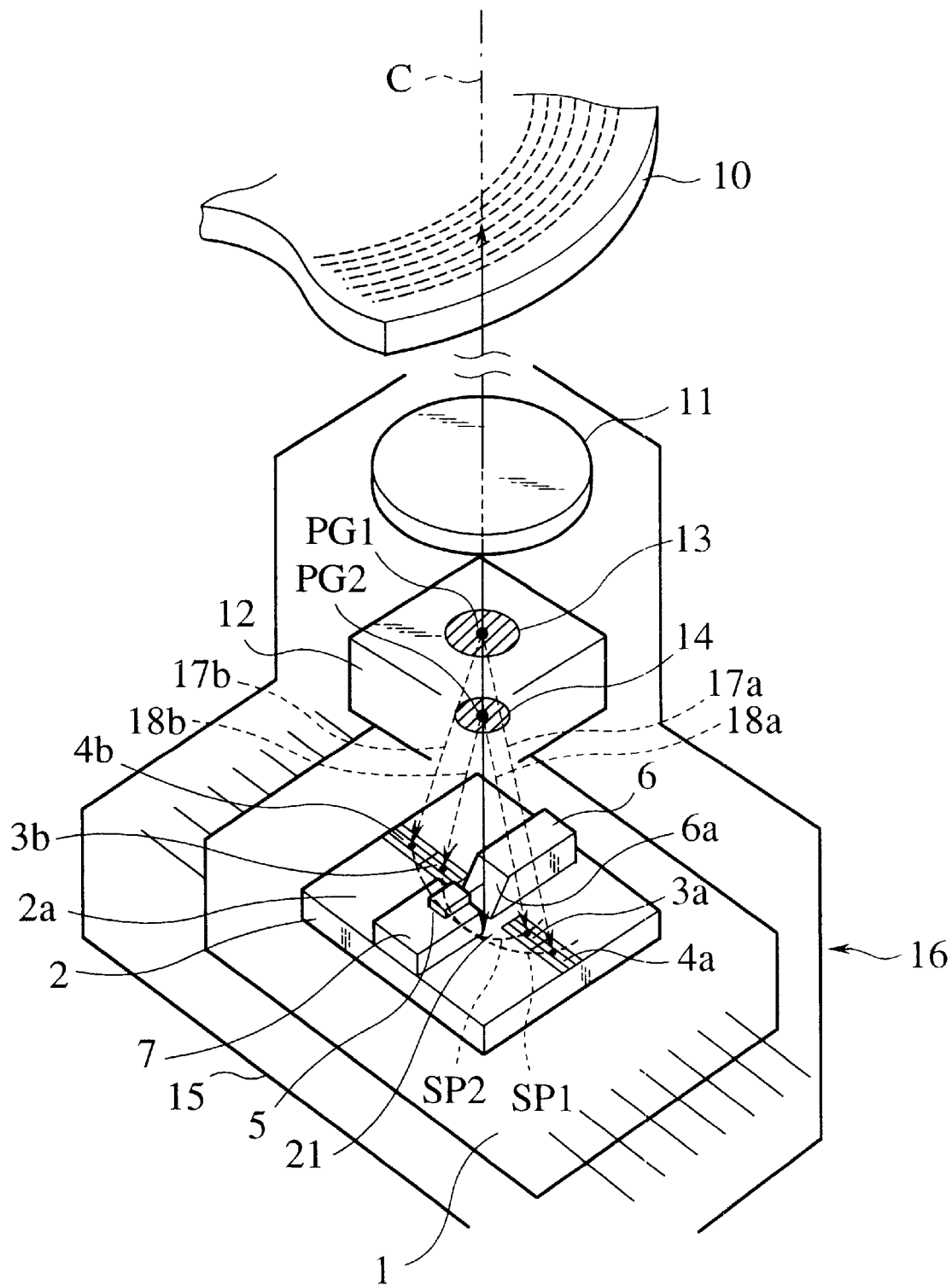
FIG. 1 is a schematic perspective view of an optical pickup according to a first embodiment of the present invention.
Figure 2B:
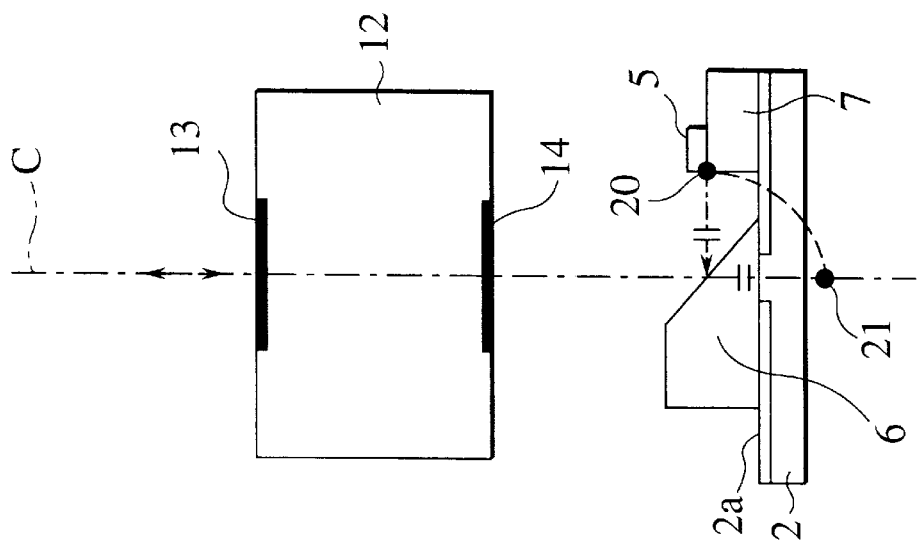
FIG. 2B is a view taken along an arrow M of FIG. 2A.
Figure 2A:
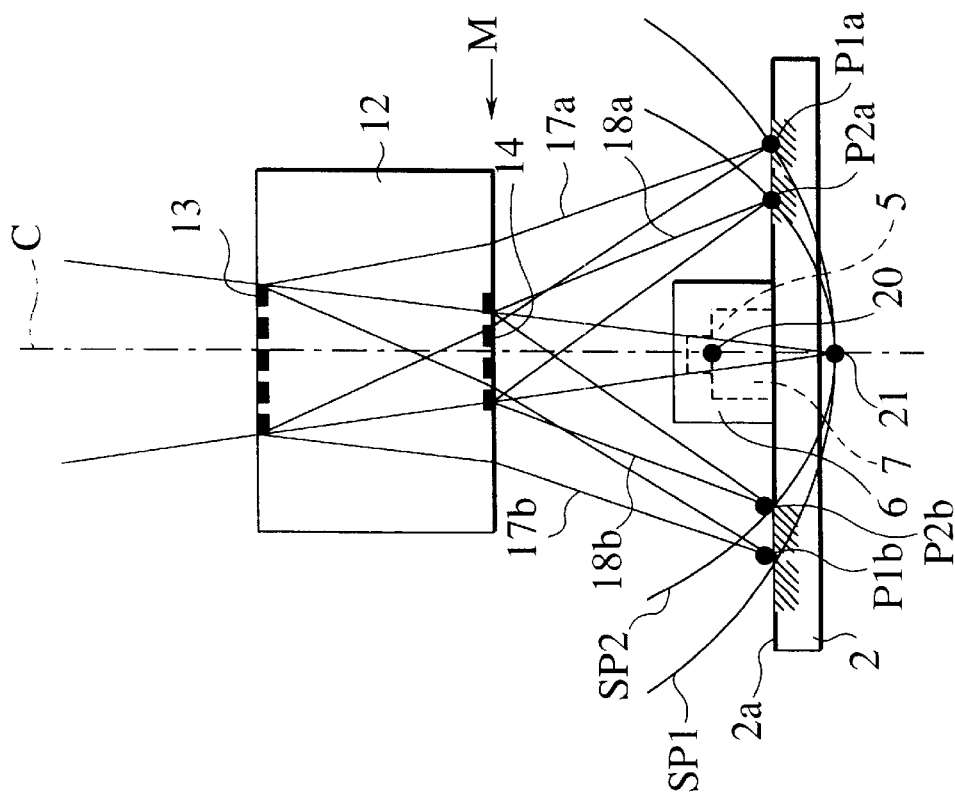
FIG. 2A is a diagram pertinent to the first embodiment of the present invention, showing a state of diffraction of first and second diffraction gratings and an irradiation state of its ±primary-order diffracted light to a light receiving device substrate.
Figure 3:
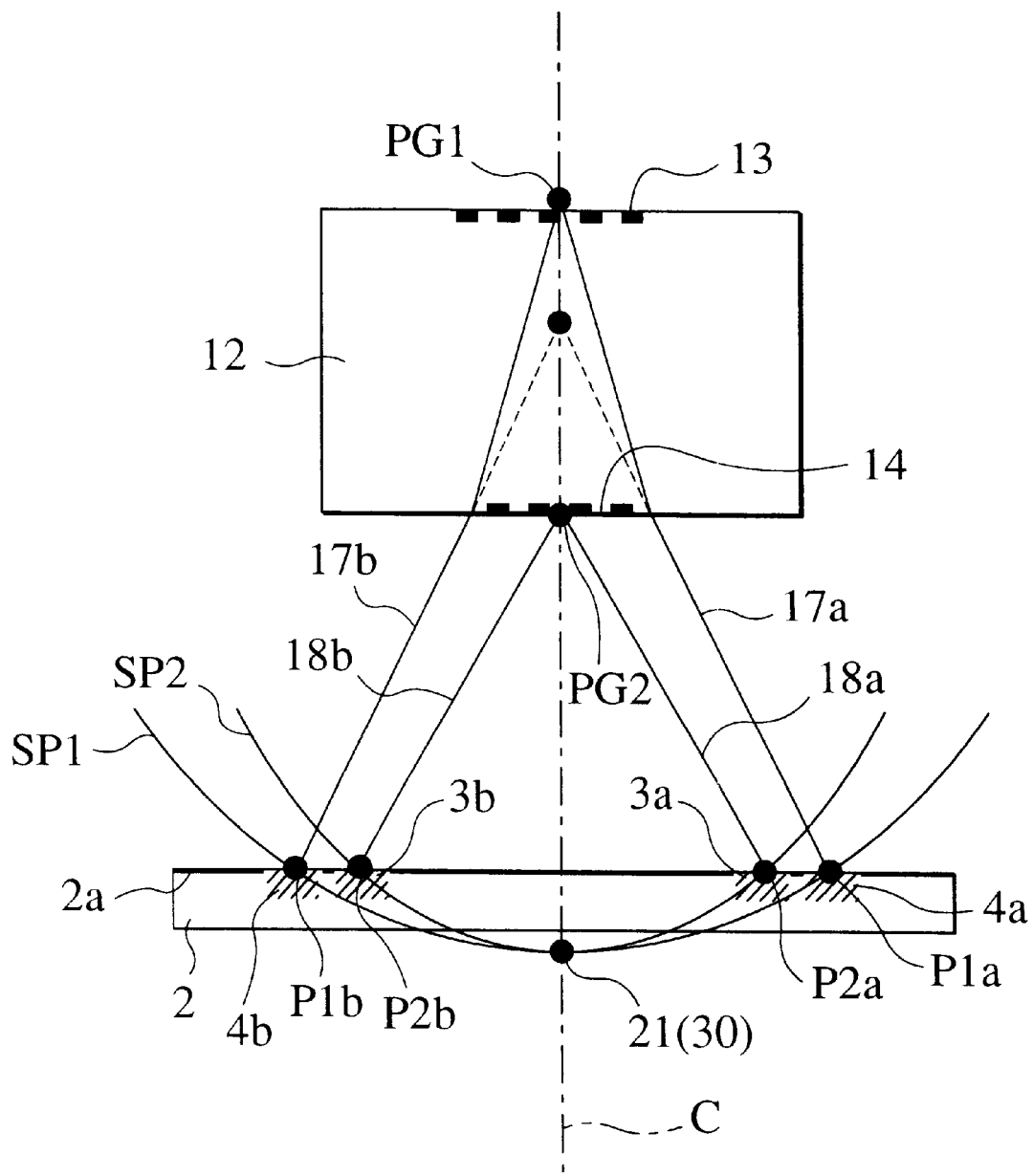
FIG. 3 is a diagram pertinent to the present invention, for explaining dispositions of the first diffraction grating, second diffraction grating and light receiving device substrate.

Hereinafter, the embodiment of the present invention will be described with reference to the accompanying drawings. FIGS. 1–3 show a first embodiment of the present invention. Referring to FIG. 1, a light receiving device (photodetector) substrate 2 is fixed on a wiring substrate 1 and four light receiving regions 3a, 3b, 4a, 4b are disposed on a straight line on this light receiving device substrate 2. The four light receiving regions 3a, 3b, 4a, 4b are disposed on the same light receiving plane 2a. A pair of inner light receiving regions 3a, 3b and a pair of outer light receiving regions 4a, 4b are disposed with a point which an optical axis C passes through as a center.

Each of those four light receiving regions 3a, 3b, 4a, 4b is divided to its central portion (not provided with any reference numeral) and outer portions on both sides (not provided with any reference numeral) and the division ratio is set up so that spot light amounts of the central portion and the two outer portions are equal to each other.

A laser beam source 5 and a micro mirror 6 are fixed at positions turned at 90° with respect to the four light receiving regions 3a, 3b, 4a, 4b disposed on the same straight line. The laser beam source 5 is fixed on the light receiving device substrate 2 via a sub-mount member 7 and this laser beam source 5 comprises a first laser beam source portion (not shown) and a second laser beam source portion (not shown).

According to the first embodiment, the first laser beam source portion and the second laser beam source portion are both semiconductor lasers which are formed monolithically on the same chip. The first laser beam source and the second laser beam source are disposed adjacent to each other and emission beams therefrom are emitted horizontally along substantially the same optical axis. The first laser beam source portion emits a light having a wave length of 780 nm and the second laser beam source portion emits a light having a wave length of 650 nm.

A face opposing the laser beam source 5, of the micro mirror 6 is constructed In the form of a mirror surface 6a and this mirror surface 6a is inclined at 45° in a vertical direction with respect to a horizontal plane. Respective emission lights from the laser beam source device 5 are reflected by the micro mirror 6 so that they are converted to lights having the same optical axis C in the vertical direction. The respective emission lights are emitted through substantially the same optical axis C in the vertical direction to a disc 10 as an information recording medium and reflected lights from the disc 10 are returned through the same optical axis C.

An objective lens 11 and a sheet-like (plate) member 12 are disposed in order from the side of the disc 10 on the optical axis C in the vertical direction. The objective lens 11 converges light introduced from the laser beam source 5 via the sheet-like member 12 to an information recording layer (not shown) of the disc 10.

A first diffraction grating 13 is formed on a top face of the sheet-like member 12 and a second diffraction grating 14 is formed on a bottom face thereof. The first diffraction grating 13 and the second diffraction grating 14 are disposed substantially vertically with respect to the above-mentioned optical axis C. In the first embodiment, the above optical axis C serves as an incident optical axis from the laser beam source 5 with respect to the first and second diffraction gratings 13, 14 and further as an incident optical axis of a reflection light from the disc 10. Meanwhile, substantially vertical mentioned here is a concept including accurately vertical in this specification.

The first diffraction grating 13 is formed of a hologram device (holographic element) having a lens power (lens action) and constructed so as to diffract a light having a wave length of 780 nm.

The second diffraction grating 14 is formed of a hologram device having a lens power (lens action) like the first diffraction grating 13 and constructed so as to diffract a light having a wave length of 650 nm.

The objective lens 11, sheet-like member 12, light receiving device substrate 2 and laser beam source 5 are fixed integrally in the same casing(package) 15.

Next, dispositions of the first diffraction grating 13, second diffraction grating 14 and light receiving device substrate 2 will be described with reference to FIG. 3. In FIG. 3, a point where the aforementioned incident optical axis C intersects the first diffraction grating 13 is assumed to be first intersection point PG1. A length from the first intersection point PG1 to a point P1a at which +primary-order (+1st-order) diffracted light 17a diffracted by the first diffraction grating 13 intersects a light receiving plane 2a is assumed to be first-a(1a) optical path length and a length from the first Intersection point FG1 to a point P1b at which −primary-order (−1st-order) diffracted light 17b diffracted by the first diffraction grating 13 intersects a light receiving plane 2a is assumed to be first-b(1b) optical path length. Further, an average of the first-a(1a) optical path length and the first-b(1b) optical path length is assumed to be first average optical path length L1 (L1=(first-a(1a) optical path length +first-b(1b) optical path length)/2).

On the other hand, a point where the incident optical axis C intersects the second diffraction grating 14 is assumed to be second intersection point PG2. A length from this second intersection point PG2 to a point P2a at which +primary-order diffracted light 18a diffracted by the second diffraction grating 14 intersects a light receiving plane 2a is assumed to be second-a(2a) optical path length and a length from the second intersection point PG2 to a point P2b at which −primary-order diffracted light 18b diffracted by the second diffraction grating 14 intersects a light receiving plane 2b is assumed to be second-b(2b) optical path length. Further, an average of the second-a(2a) optical path length and second-b(2b) optical path length is assumed to be second average optical path length L2 (L2=(second-a(2a) optical path length +second-b(2b) optical path length)/2).

The first diffraction grating 13, second diffraction grating 14 and light receiving device substrate 2 are disposed in such a manner that a first curve SP1 in which the first average optical path length L1 is constant and a second curve SP2 in which the second average optical path length L2 is constant make a contact with each other at a conjugate point 21 of an emission point 20 (shown in FIGS. 2A, 2B) of the laser beam source 5 or intersect each other substantially at a single point.

Although the light receiving device substrate 2 can be disposed at the right angle or obliquely with respect to the incident optical axis C in a range of the above-described condition, according to the first embodiment, the light receiving device substrate 2 is disposed substantially at the right angle with respect to the incident optical axis C.

Next, an operation of the above structure will be described. If a light having a wave length of 780 nm is emitted from the laser beam source device 5, this emission light is reflected by the micro mirror 6 and converted to a light having the optical axis C in the vertical direction. After passing through the second diffraction grating 14 and the first diffraction grating 13, usually d light having the incident optical axis C is converted to parallel light by a collimator lens (not shown) and then focused on an information recording surface (not shown) of the disc 10 by the objective lens 11. A reflection light from the disc 10 is converged and impinges upon the first diffraction grating 13 via an inverse path to the above-mentioned path.

Then, this light is divided to the ±primary-order (±1st-order) diffracted lights 17a, 17b by the diffracting action of the first diffraction grating 13 and the ±primary-order diffracted lights 17a, 17b are irradiated to the light receiving regions 4a, 4b of the light receiving device substrate 2.

A converging point of light passing through the first and second diffraction gratings 13, 14 as 0-order (0th-order) light is the conjugate point 21 or near point. Thus, assuming that the first diffraction grating 13 has no lens power, the ±primary-order diffracted lights 17a, 17b from the first diffraction grating 13 are converged on the first curve SP1 in contact with the conjugate point 21.

Therefore, one 17b of the ±primary-order diffracted lights by the first diffraction grating 13 composed by a hologram device forms a focus point or focal line by the lens power before it reaches the light receiving plane 2a, and the other one 17a of the ±primary-order diffracted lights forms a focus point or focal line in the back of the light receiving plane by the lens power. The ±primary-order diffracted lights 17a, 17b have deflections in focus point in an opposite direction to each other and are irradiated on the light receiving regions 4a, 4b with a predetermined (substantially the same) spot size. With a deflection of the disc 10 in the direction of the focus point, its size changes in an opposite direction. Consequently, an optical system based on spot size method, preferable for detection of a focus error can be constructed.

If a light having the wave length of 650 nm in emitted from the laser beam source 5, this light reaches the disc 10 in the same way as described above and its reflection light passes through the first diffraction grating 13 and then impinges upon the second diffraction grating 14.

The emission light is divided to the ±primary-order diffracted lights 18a, 18b by the diffracting action of the second diffraction grating 14 and this ±primary-order diffracted lights 18a, 18b are emitted to the light receiving regions 3a, 3b of the light receiving device substrate 2.

Here, because the converging point of light passing through the first and second diffraction gratings 13, 14 as the 0-order light is the conjugate point 21 or near point, if it is assumed that the second diffraction grating 14 has no lens power, ±primary-order diffracted light diffracted by the second diffraction grating 14 is converged on the second curve SP2 in contact with the conjugate point 21.

Therefore, one 18b of the ±primary-order diffracted lights by the second diffraction grating 13 composed of a hologram device forms a focus point or focal line by lens power (lens action) before it reaches the light receiving plane 2a, and the other one 18a of the ±primary-order diffracted lights forms a focus point or focal line by the lens power in the back of the light receiving plane 2a. Then, the ±primary-order diffracted lights have deflections in focus point in an opposite direction to each other and are irradiated on the light receiving regions 3a, 3b with a predetermined (substantially the same) spot size. With a deflection of the disc 10 in the direction of the focus point, its size changes in an opposite direction. Consequently, an optical system based on spot size method, preferable for detection of a focus error can be constructed.

As a result, the light receiving plane 2a of the light receiving device substrate 2 can be set up for the ±primary-order diffracted lights by the first diffraction grating 13 and the ±primary-order diffracted lights of the second diffraction grating 14 as an optimum light receiving plane. Further, for two lights having different wave lengths (wave length of 780 nm and wave length of 650 nm), the incident optical axis C from the laser beam source 5 to the disc 10 and the incident optical axis C from the disc 10 to the light receiving device substrate 2 are made common and the respective ±primary-order diffracted lights 17a, 17b, 18a, 18b having the different wave lengths by the first and second diffraction gratings 13, 14 can be received by the single light receiving device substrate 2, thereby contributing to integration of the optical system.

Therefore, the optical device 16 in which such an optical pickup is integrated can be constructed in a compact form.

According to the first embodiment, the incident light axis C is set up so as to pass through the conjugate point 21 of the emission point 20 of the laser beam source 5 and thus the laser beam source 5 can be fixed on the light receiving device substrate 2, therefore contributing to further integration of the optical system. Thus, the optical device 16 in which such an optical pickup is integrated can be constructed further in a compact form. Meanwhile, the aforementioned incident optical axis C may be set up so as to pass through the emission point 20 of the laser beam source 5.

Because according to the first embodiment, the four light receiving regions 3a, 3b, 4a, 4b are disposed on a straight line on the light receiving device substrate 2, a difficulty of disposing the micro mirror 6, sub-mount member 7 and the like is reduced, so that the freedom of the optical disposition can be improved.

Although according to the first embodiment, the first laser beam source and the second laser beam source are formed monolithically on the same chip, they may be formed in a hybrid structure. Although according to the first embodiment, the four light receiving regions 3a, 3b, 4a, 4b are disposed in the light receiving device substrate 2, it is permissible to integrally combine the inner light receiving region 3a with the outer light receiving region 4a of one side and integrally combine the inner light receiving region 3b with the outer light receiving region 4b of the other side.

That is, because two discg like DVD using the wave length of 650 nm and CD using the wave length of 780 nm are not used at the same time, the same wiring can be used by sharing the light receiving region, thereby making possible simplification of the circuit, reduction of the number of necessary wires and further reduction of package size and thinning of the device accompanied thereby.

Although according to the first embodiment, the laser beam source 5 is fixed on the light receiving device substrate 2 via the sub-mount member 7, if the conjugate point 21 of the emission point 20 of the laser beam source 5 can be disposed near the light receiving plane 2a of the light receiving device substrate 2, the laser beam source 5 may be fixed directly on the light receiving device substrate 2. With such a structure, not only reduction of the number of parts but also thinning of the device is enabled.

Next, a second embodiment of the present invention will be described. A description of the same parts as those of the first embodiment is omitted to avoid a duplicate description and only different parts will be described. That is, what is different from the aforementioned embodiment is the dispositions of the first and second diffraction gratings 13, 14 and the light receiving device substrate 2, and FIG. 4 is a structure diagram showing diffractions of the first and second diffraction gratings 13, 14 and disposition of the light receiving device substrate 2.

Figure 4:
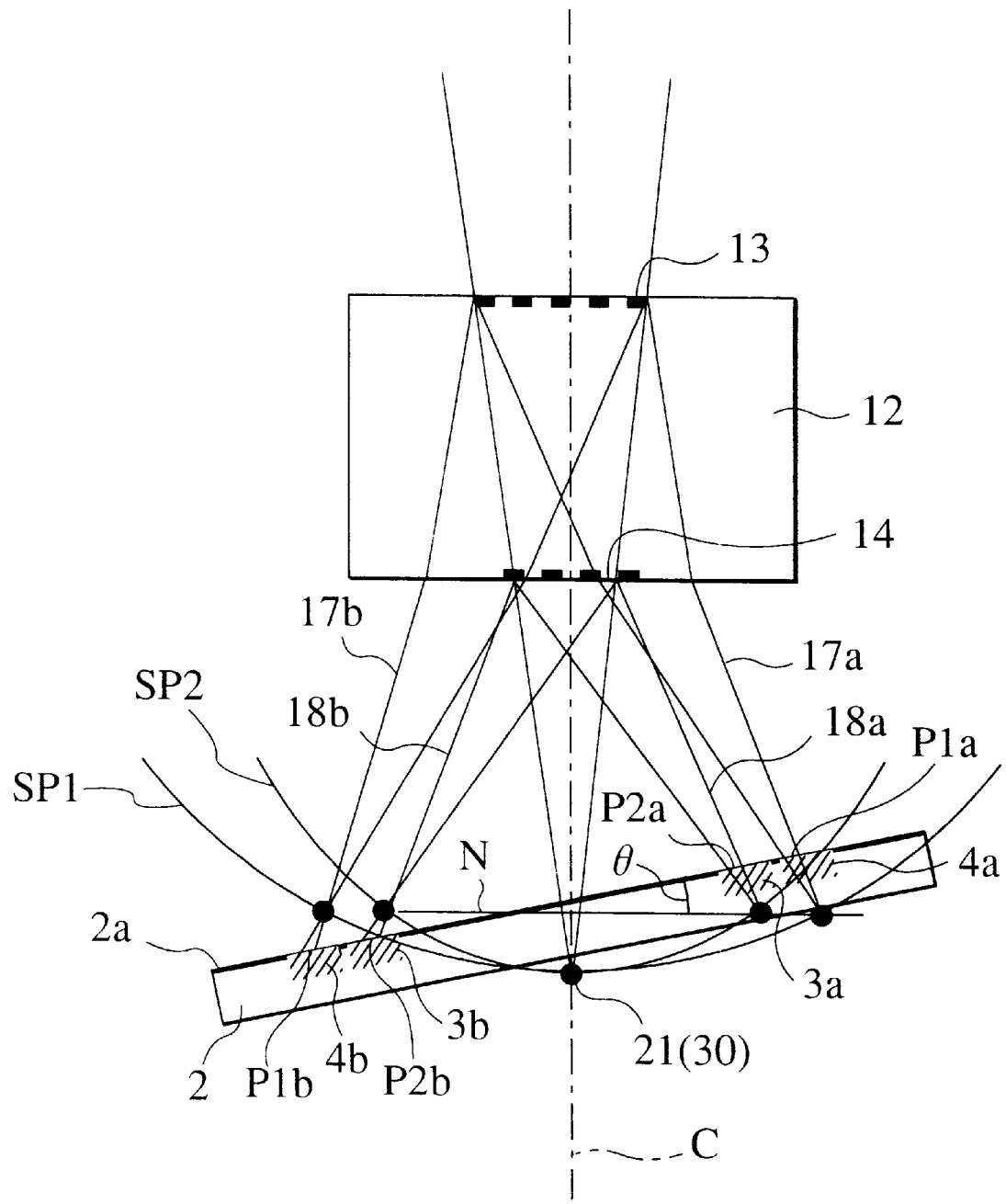
FIG. 4 is a diagram pertinent to a second embodiment, showing a state of diffraction of the first and second diffraction gratings and disposition of the light receiving device substrate.

In FIG. 4, the first and second diffraction gratings 13, 14 are constructed as not a hologram device but a device having no lens power for only carrying out diffracting action (for example, grating). Like the first embodiment, the first diffraction grating 13 diffracts a light having the wave length of 780 nm and the second diffraction grating 14 diffracts a light having the wave length of 650 nm.

The light receiving device substrate 2 is disposed such that it is inclined at an inclination angle θ with a perpendicular plane N to the aforementioned incident optical axis C.

An operation of the above structure will be described. If a light having the wave length of 780 nm is emitted from the laser beam source 5, this emission light passes through the same path as the first embodiment and reaches a disc. A reflection light from the disc passes through the same path in an opposite direction and impinges upon the first diffraction grating 13.

This light is divided to the ±primary-order diffracted lights 17a, 17b by the diffracting action of the first diffraction grating 13 and the ±primary-order diffracted lights 17a, 17b are irradiated to the light receiving regions 4a, 4b of the light receiving device substrate 2.

Here, because a converging point of light passing through the first and second diffraction gratings 13, 14 as the 0-order light is the conjugate point 21 of the emission point 20 of the laser beam source 5 or near point, the ±primary-order diffracted lights by the first diffraction grating 13 is converged on a first curve SP1 in contact with the above conjugate point 21. Because the light receiving device substrate 2 is disposed such that it is inclined with respect to the perpendicular plane to the incident optical axis C, one of the first-a(1a) optical path length and the first-b(1b) optical path length increases with respect to the first average optical path length L1 and the other decreases by the same distance.

Therefore, one 17b of the ±diffracted lights by the first diffraction grating 13 forms a focus point or focal line before it reaches the light receiving plane 2a, and the other 17a of the ±diffracted lights forms a focus point or focal line in the back of the light receiving plane 2a. The ±primary-order diffracted lights 17a, 17b have deflections of the focus point in opposite directions to each other and are irradiated to the light receiving regions 4a, 4b with a predetermined (substantially the same) spot size. With a deflection of the disc 10 in the direction of the focus point, its size changes in an opposite direction. As a result, an optical system preferable for detection of a focus error by the spot size method is constructed.

If a light having the wave length of 780 nm is emitted from the laser beam source 5, this emission light reaches the disc 10 via the same path as described above and the reflection light passes through the first diffraction grating 13 and impinges upon the second diffraction grating 14.

This light is divided to the ±primary-order diffracted lights 18a, 18b by the diffracting action of the second diffraction grating 14 and the ±primary-order diffracted lights 18a, 18b are irradiated to the light receiving regions 3a, 3b of the light receiving device substrate 2.

Because the converging point of light passing through the first and second diffraction gratings 13, 14 as the 0-order light is the conjugate point 21 of the emission point 20 of the laser beam source 5 or a near point, the ±primary-order diffracted lights by the second diffraction grating 14 is converged on the second curve SP2 in contact with the aforementioned conjugate point 21. Further, because the light receiving device substrate 2 is inclined with respect to the perpendicular plane N to the optical axis C, one of the second-a(2a) optical path length and the second-b(2b) optical path length increases with respect to the second average optical path length L2 while the other decreases by the same distance.

Therefore, one 18b of the ±primary-order diffracted lights by the second diffraction grating 14 forms a focus point or a focal line before it reaches the light receiving plane 2a, and the other 18a of the ±primary-order diffracted lights forms a focus point or a focal line in the back of the light receiving plane 2a. Then, the ±primary-order diffracted lights 18a, 18b have deflections of the focus point in opposite directions to each other and are irradiated to the light receiving regions 3a, 3b with a predetermined (substantially the same) spot size. With a deflection of the disc in the direction of the focus point, the sizes changes in opposite directions. As a result, an optical system preferable for detection of the focus error by the spot size method is constructed.

The light receiving plane 2a of the light receiving device substrate 2 can be set up as an optimum light receiving plane for the ±primary-order diffracted lights 17a, 17b by the first diffraction grating 13 and the ±primary-order diffracted lights 18a, 18b by the second diffraction grating 14. Further, for two lights having different wave lengths (wave length of 780 nm and wave length of 650 nm), the optical axes C are made common and the respective ±primary-order diffracted lights 17a, 17b, 18a, 18b having the different wave lengths by the first and second diffraction gratings 13, 14 can be received by the single light receiving device substrate 2, thereby contributing to integration of the optical system.

Although according to the first and second embodiments, the laser beam source 5 is fixed on the light receiving device substrate 2 via the sub-mount member 7 such that the conjugate point 21 of the emission point 20 of the laser beam source is located on the optical axis C, the laser beam source 5 may be formed separately from the optical device 16. That is, it is permissible to dispose the emission point 20 of the laser beam source 5 or its conjugate point 21 at points not located on the optical axis C.

In this case, the first diffraction grating 13, the second diffraction grating 14 and the light receiving device substrate 2 are disposed in such a way that the first curve SP1 in which the first average optical path length L1 is constant, the second curve SP2 in which the second average optical path length L2 is constant and an optical axis after the reflection light from the disc 10 passes through the first and second diffraction gratings 13, 14 intersect each other at a point 30 or substantially single point. This configuration has an advantage that the freedom of the disposition of the laser beam source 5 is expanded.

With this structure, the reflection light from the disc impinges upon the first and second diffraction gratings 13, 14 and the light passing through the first and second diffraction gratings 13, 14 as the 0-order light is converged at an intersection point 30 of the first curve SP1, second curve SP2 and optical axis C or substantially converged at that intersection point. As a result, an optical system in which the reflection light travels from the disc 10 to the light receiving device substrate is the same optical system as the first and second embodiments.

Therefore, even if the light receiving device substrate 2 is disposed in any way within the above condition, the first-a (1a) optical path length and the first-b(1b) optical length are equal with respect to the first average optical length L1 and the second-a(2a) optical path length and second-b(2b) optical path length are equal with respect to the second average optical path length L2, or always one thereof increases and the other decreases. Thus, the light receiving plane 2a of the light receiving device substrate can be set up as an optimum light receiving plane for the ±primary-order diffracted lights 17a, 17b by the first diffraction grating 13 and the ±primary-order diffracted lights 18a, 18b by the second diffraction grating 14.

For the two lights having different wave lengths, their optical axes C are made common and the ±primary-order diffracted lights 17a, 17b, 18a, 18b having the different wave lengths by the first and second diffraction gratings 13, 14 can be received by the single light receiving device substrate 2 thereby contributing to integration of the optical system. In this case, an optical device (more specifically, including the first diffraction grating 13, second diffraction grating 14, light receiving device substrate 2 and the like) not including any laser beam source is integrated.

Meanwhile, adjustment of respective parts about their disposition is carried out in the following manner. That is, positions of the respective light receiving regions 3a, 3b, 4a, 4b of the light receiving device substrate 2 may be determined by mask design. A position of the micro mirror 6 may be determined such that the conjugate point 21 of the laser beam source 20 is located at the center of symmetry of the light receiving regions 3a, 3b, 4a, 4b. As for the position of the laser beam source 5, the height of the emission point 20 may be controlled by adjusting the height of the sub-mount member 7. As for an emission direction thereof, a depth (depth from a top surface of the light receiving device substrate 2) of the conjugate point 21 can be controlled by adjusting the mounting position of the sub-mount member 7 in far-and-near direction relative to the mirror. By such an adjustment, detection of a focus error based on two-system complementary spot size method is achieved preferably.

As other embodiment of the present invention, the first and second diffraction gratings 13, 14 are provided with no lens power (lens action) but only the diffracting action. The light receiving device substrate 2 is disposed substantially perpendicular to the optical axis C. That is, a structure shown in FIG. 3 is obtained.

With such a structure, as for one incident light, two converged lights each without deflection of the focus point are obtained on the respective light receiving regions 3a, 3b of the light receiving device substrate 2 and as for the other incident light, two converged lights without deflection of the focus point are obtained on the respective light receiving regions 4a, 4b of the light receiving device substrate 2. Because the converged light without any deflection of the focus point can be used for focus error detection based on the knife edge method or anastigmatic correction method, information reading, and the like, two optical systems preferable for such an application can be constructed.

Although according to the first and second embodiments, an optical system preferable for focus error detection based on the spot size method is formed with two lights having different wave lengths, as for two kinds of lights different in terms of an element other than the wave length (for example, polarization state), by forming the first and second diffraction gratings 13, 14 so as to diffract these two kinds of the lights respectively, two optical systems preferable for focus error detection based on the spot size method can be obtained.

As described above, according to the first embodiment, the first and second diffraction gratings 13, 14 are formed of the hologram device and the light receiving device substrate 2 is disposed substantially perpendicular to the optical axis C. According to the second embodiment, the first and second diffraction gratings 13, 14 are provided with no lens power (lens action) and the light receiving device substrate 2 is inclined with the perpendicular plane N to the optical axis C. Alternatively, it is permissible to combine the first embodiment with the second embodiment. That is, it is permissible to construct the optical system based on the first embodiment and then use the method of the second embodiment for fine adjustment of the spot size. In this case, it is also permissible to reverse the embodiments.

According to the first and second embodiments, because the first and second diffraction gratings 13, 14 are disposed on the top and bottom surfaces of the sheet-like member 12, parallel diffraction gratings can be produced easily and by placing the sheet-like member 12 perpendicular to the optical axis C or such that it is inclined at a predetermined angle, the first and second diffraction gratings 13, 14 can be disposed at appropriate positions.

According to the first embodiment, the first and second diffraction gratings 13, 14 are formed each with the hologram device and two optical systems preferable for detection of the focus error based on the spot size method are constructed. If only one of the first and second diffraction grating 13,14 is formed of the hologram device and the other one is provided with no lens power (lens action), two optical systems can be formed in which one is an optical system preferable for detection of the focus error based on the spot size method and the other is an optical system capable of obtaining a converged light without deflection of the focus point, preferable for focus error detection based on the knife edge method or anastigmatic correction method and information reading is formed.

Because according to the first and second embodiments, the CD system and CD-R system use a light source having the wave length of 780 nm and the DVD system uses a light source having the wave length of 650 nm, the optical pickup and optical device according to the first and second embodiments can be applied to compatible reproduction from the CD system or CD-R system and DVD system.

More generally, it should be understood that many modifications and adaptations of the invention will become apparent to those skilled in the art and it is intended to encompass such obvious modifications and changes in the scope of the claims appended hereto.

What is claimed is:

1. An optical pickup for irradiating light to an information recording medium and reading information by using a reflection light from the information recording medium, the optical pickup comprising:

a first diffraction grating disposed substantially perpendicular to an incident optical axis of the reflection light;

a second diffraction grating disposed substantially perpendicular to an incident optical axis of the reflection light and on a face different from a face on which the first diffraction grating is provided; and a light receiving device substrate having light receiving plane on the same level, on which the reflection light from the information recording medium impinges and for receiving ±primary-order diffracted light diffracted/ divided by the first diffraction grating and the second diffraction grating;

wherein a point where the first diffraction grating and the incident optical axis intersect is named an first intersection point, a length from the first intersection point to point where +primary-order diffracted light diffracted by the first diffraction grating intersects the light receiving plane is named as first-a optical path length, a length from the first intersection point to a point where −primary-order diffracted light diffracted by the first diffraction grating intersects the light receiving plane is named as first-b optical path length, and an average of the first-a optical path length and first-b optical path length is named as first average optical path length, a point where the second diffraction grating and the incident optical axis intersect is named as second intersection point, a length from the second intersection point to a point where +primary-order diffracted light diffracted by the second diffraction grating intersects the light receiving plane L1 named as second-a optical path length, a length from the second intersection point to a point where −primary-order diffracted light diffracted by the second diffraction grating intersects the light receiving plane is named as second-b optical path length, and an average of the second-a optical path length and second-b optical path length is names as second average optical path length, the first diffraction grating, the second diffraction grating and the light receiving device substrate being disposed such that a first curve in which the first average optical path length is constant, a second curve in which the second average optical path length is constant and an optical axis after a reflection light from the information recording medium passes through the first and second diffraction gratings as 0-order light intersects at a single point or substantially single point.

2. An optical pickup according to claim 1 wherein the light receiving device substrate is disposed substantially perpendicular to the incident optical axis of the reflection light and any one or both of the first diffraction grating and the second diffraction grating are formed of a hologram device having lens power.

3. An optical pickup according to claim 1 wherein the light receiving device substrate is so disposed as to be inclined with respect to a plane perpendicular to the incident optical axis.

4. An optical device for use in the optical pickup according to claim 1 wherein the first diffraction grating, the second diffraction grating and the light receiving device substrate are fixed integrally in the same casing.

5. An optical device according to claim 4 wherein the light receiving device substrate is disposed substantially perpendicular to the incident optical axis of the reflection light and any one or both of the first diffraction grating and the second diffraction grating are composed of a hologram device having lens power.

6. An optical device according to claim 4 wherein the light receiving device substrate is so disposed as to be inclined with respect to a plane perpendicular to the incident optical axis.

7. An optical pickup for irradiating light to an information recording medium and reading information by using a reflection light from the information recording medium, the optical pickup comprising:

a laser beam source capable of emitting two different wave length lights;

a first diffraction grating disposed substantially perpendicular to an incident optical axis of the reflection light;

a second diffraction grating disposed substantially perpendicular to an incident optical axis of the reflection light and on a face different from a face on which the first diffraction grating is provided; and a light receiving device substrate having light receiving plane on the same level, on which the reflection light from the information recording medium impinges and for receiving ±primary-order diffracted light diffracted/ divided by the first diffraction grating and the second diffraction grating;

wherein a point where the first diffraction grating and the incident optical axis intersect is named as first intersection point, a length from the first intersection point to a point where +primary-order diffracted light diffracted by the first diffraction grating intersects the light receiving plane is named as first-a optical path length, a length from the first intersection point to a point where −primary-order diffracted light diffracted by the first diffraction grating intersects the light receiving plane is named as first-b optical path length, and an average of the first-a optical path length and first-b optical path length is named as first average optical path length, a point where the second diffraction grating and the incident optical axis intersect is named as second intersection point, a length from the second intersection point to a point where +primary-order diffracted light diffracted by the second diffraction grating intersects the light receiving plane is named as second-a optical path length, a length from the second intersection point to a point where –primary-order diffracted light diffracted by the second diffraction grating intersects the light receiving plane is named as second-b optical path length, and an average of the second-a optical path length and the second-b optical path length is names as second average optical path length, the first diffraction grating, the second diffraction grating and the light receiving device substrate being disposed such that a first curve in which the first average optical path length is constant and a second curve in which the second average optical path length is constant are in contact with each other at an emission point of the laser beam source or its conjugate point or intersect each other at a substantially single point.

8. An optical pickup according to claim 7 wherein the light receiving device substrate is disposed substantially perpendicular to the incident optical axis of the reflection light and any one or both of the first diffraction grating and the second diffraction grating are formed of a hologram device having lens power.

9. An optical pickup according to claim 7 wherein the light receiving device substrate is so disposed as to be inclined with respect to a plane perpendicular to the incident optical axis.

10. An optical device for use in the optical pickup according to claim 7 wherein the laser beam source, the first diffraction grating, the second diffraction grating and the light receiving device substrate are fixed integrally in the same casing.

11. An optical device according to claim 10 wherein the light receiving device substrate is disposed substantially perpendicular to the incident optical axis of the reflection light and any one or both of the first diffraction grating and the second diffraction grating are composed of a hologram device having lens power.

12. An optical device according to claim 10 wherein the light receiving device substrate is so disposed as to be inclined with respect to a plane perpendicular to the incident optical axis.

* * * * *

UNITED STATES PATENT AND TRADEMARK OFFICE
CERTIFICATE OF CORRECTION

PATENT NO. : 6,320,837 B1
DATED : November 20, 2001
INVENTOR(S) : Minoru Ohyama

It is certified that error appears in the above-identified patent and that said Letters Patent is hereby corrected as shown below:

<u>Column 13,</u>
Line 55, change "L1" to -- is --.

Signed and Sealed this

Eleventh Day of June, 2002

*Attest:*

*Attesting Officer*

JAMES E. ROGAN
*Director of the United States Patent and Trademark Office*